United States Patent
Honda et al.

(10) Patent No.: US 7,378,037 B2
(45) Date of Patent: May 27, 2008

(54) ORGANOTIN COMPOUND TREATMENT

(75) Inventors: Katsuhisa Honda, Matsuyama (JP); Tomofumi Takahashi, Matsuyama (JP)

(73) Assignee: Miura Co., Ltd., Matsuyama-shi (JP)

( * ) Notice: Subject to any disclaimer, the term of this patent is extended or adjusted under 35 U.S.C. 154(b) by 51 days.

(21) Appl. No.: 11/447,095

(22) Filed: Jun. 6, 2006

(65) Prior Publication Data
US 2006/0276666 A1 Dec. 7, 2006

(30) Foreign Application Priority Data
Jun. 7, 2005 (JP) .............................. 2005-166475

(51) Int. Cl.
*C09K 3/00* (2006.01)
*A62D 3/00* (2007.01)
*C07F 7/00* (2006.01)
(52) U.S. Cl. ..................... 252/183.14; 252/182.33; 556/88; 588/315; 588/407; 210/633
(58) Field of Classification Search .............. 556/88; 588/315, 407; 210/633; 252/182.33, 183.14
See application file for complete search history.

(56) References Cited

U.S. PATENT DOCUMENTS 4,592,843 A 6/1986 Guilbault et al.
5,759,939 A * 6/1998 Klabunde et al. .......... 502/328

FOREIGN PATENT DOCUMENTS

| JP | 61-107989 A | 5/1986 |
| JP | 2001-352994 A | 12/2001 |
| JP | 2004-160355 A | 6/2004 |
| JP | 2005-502457 A | 1/2005 |
| WO | WO-03/022749 A1 | 3/2003 |

OTHER PUBLICATIONS

Report (proposal) regarding test results of endocrine disturbing action of tributyltin (TBT) to fish, Environmental Health Department, Environmental Policy Bureau, Ministry of the Environment, Aug. 2001.
Abstracts for the 4th Annual Meeting of JSEDR, 2001, p. 288.
Harino et al., Environmental Pollution, vol. 98, No. 2, 1997, pp. 163-167.

* cited by examiner

*Primary Examiner*—Porfirio Nazario-Gonzalez
(74) *Attorney, Agent, or Firm*—Birch, Stewart, Kolasch & Birch, LLP

(57) ABSTRACT

To treat an organotin compound in a liquid at low cost. Addition of iron oxide into a liquid containing an organotin compound allows trapping of the organotin compound in the liquid by the iron oxide, and reduction of the organotin compound concentration in the liquid. Various iron oxides such as FeO, $Fe_2O_3$ (iron sesquioxide), and $Fe_3O_4$ (iron oxide black) may be used, but iron oxide black is preferred. Such the method of treating a liquid may be applied to polluted seawater at a harbor to allow reduction of the organotin compound concentration in the seawater and purification of the harbor.

10 Claims, No Drawings

ORGANOTIN COMPOUND TREATMENT

BACKGROUND OF THE INVENTION

1. Field of the Invention

The present invention relates to a treatment, and more specifically to a treatment for treating an organotin compound in a liquid.

2. Description of the Related Art

An organotin compound, in particular, a tributyltin (TBT) compound or a triphenyltin (TPT) compound is useful as a molluscan eliminating agent component for an antifouling paint employed in fishnets or ships, a pesticide for pears or onions, a mouse repellant or an insecticide for wood products and the like, an industrial disinfectant for papermaking or leather processing, etc., and is conventionally used worldwide. In recent years, it has been revealed that the organotin compound has an endocrine disturbing action, and the organotin compound is recognized as a toxic substance providing adverse effects on human health and ecosystem. For example, "Report (proposal) regarding test results of endocrine disturbing action of tributyltin (TBT) to fish" (Environmental Health Department, Environmental Policy Bureau, Ministry of the Environment (August 2001)) and "Present status and temporal trends on imposex and organotin concentrations in tissue of the rock shell, *Thais clavigera*" (Japan Society of Endocrine Disrupters Research, Abstracts for The 4th Annual Meeting of JSEDR, p. 288 (2001)) each report that snails such as rock shells (*Thais clavigera*) living at harbors have developed imposex frequently. The imposex refers to a symptom featured in sex change of female snails, and is known to be developed by an effect of a tributyltin compound in an extremely low concentration of about 2 ng/l in seawater.

Thus, in Japan, pesticide registration of the tributyltin compound expired in 1977, and use of the tributyltin compound in household products has been prohibited since 1979. In 1989, tributyltin oxide was designated as a Class I Specified Chemical Substance under "Law Concerning the Evaluation of Chemical Substances and Regulation of Their Manufacture, etc. (Japanese Chemical Substances Control Law)", and its production, import, and use have been essentially prohibited. In 1990, tributyltin chloride was designated as a Class II Specified Chemical Substance under the same law, and its use and the like has been subjected to regulation. Thus, in Japan, the organotin compound is substantially not used in applications of antifouling paints for fishnets and ships.

However, environmental pollution studies in Japan have confirmed that a pollution level of dredged soil from harbor or seawater from shelf sea or harbor due to the organotin oxide still remains the same, and no significant improvements have been confirmed. Such results have been obtained probably because the organotin compound is hardly decomposed, and foreign ships still use antifouling paints containing organotin compounds. Thus, establishment of techniques for treating dredged soil or seawater polluted with an organotin oxide is desired.

As a method of treating dredged soil in view of the above, a method of decomposing or adsorbing an organotin compound in dredged soil has been known. As an example of the method of decomposing an organotin compound, "Degradation of the tributyltin compounds by the micro-organisms in the water and sediment collected from the harbor area of Osaka City, Japan" (Environmental Pollution 98(2), 163-167, 1997) proposes a method of decomposing an organotin compound by using microorganisms. As another example of the method of decomposing an organotin compound, JP 2001-352994 A proposes a method of decomposing an organotin compound by using active components produced by microorganisms. However, those methods each require a long period of time for decomposition of the organotin compound and each require separation of the microorganisms or extraction of the active components. Thus, those methods tend to be expensive and are probably not practical.

Meanwhile, as an example of the method of adsorbing an organotin compound, JP 2004-160355 A discloses a method involving: adding a flocculant to dredged soil to separate the dredged soil into a solid content (sand and flock settled deposit) and a water content; and adhering and adsorbing the organotin compound in the separated water content to a polyethylene sheet and active carbon, respectively. However, this method has many processing steps and involves complex operations. Further, this method requires use of an expensive polyethylene sheet and a process cost is hardly suppressed.

As examples of a method of treating water such as seawater in view of the above: JP 61-107989 A proposes a method of bringing water into contact with a polyamide substance to allow an organotin compound in water to be absorbed into the polyamide substance; and JP 2005-502457 A proposes a method of irradiating water supplied with ozone with UV light. However, those methods each require an expensive polyamide substance or a complex treatment apparatus, and a process cost is hardly suppressed.

SUMMARY OF THE INVENTION

An object of the present invention is to treat an organotin compound in a liquid such as seawater at low cost.

An organotin compound treatment according to the present invention is used for treating an organotin compound in a liquid of and contains iron oxide. The iron oxide to be used is iron oxide black, for example.

The organotin compound treatment may be added to the liquid, to thereby trap efficiently the organotin compound in the liquid. Further, the treatment inhibits elution of the trapped organotin compound into the liquid.

The organotin compound treatment further contains a substance capable of releasing hydrogen, for example. The substance capable of releasing hydrogen is at least one substance selected from the group consisting of iron, sodium sulfite, sodium dithionite, and sodium hydrogen sulfite. In this case, the organotin compound treatment is capable of partly decomposing the organotin compound in the liquid.

A method of treating a liquid containing an organotin compound according to the present invention includes bringing a liquid containing an organotin compound into contact with a treatment containing iron oxide.

In this treatment method, the organotin compound in the liquid containing an organotin compound is trapped by the treatment, and the trapped organotin compound is hardly eluted from the treatment into the liquid. Thus, in the liquid employing this treatment method, an organotin compound concentration is reduced.

The treatment to be used in the treatment method further contains a substance capable of releasing hydrogen, for example. In this case, the treatment is capable of partly decomposing the organotin compound, and the organotin compound concentration in the liquid containing an organotin compound may be reduced more efficiently.

The liquid containing an organotin compound employing the treatment method is seawater, for example.

A method of treating a substance containing an organotin compound according to the present invention includes: mixing a substance containing an organotin compound and a treatment containing iron oxide in the presence of a liquid; and removing the liquid from a mixture of the substance containing an organotin compound and the treatment.

In the step of mixing a substance containing an organotin compound and the treatment in the presence of the liquid in this treatment method, the organotin compound is eluted from the substance containing an organotin compound into the liquid. The eluted organotin compound is trapped by the treatment, and the organotin compound trapped by the treatment is hardly eluted into the liquid. Then, the liquid is removed from the mixture of the substance containing an organotin compound and the treatment. As a result, even in the case where the obtained residue is brought into contact with a liquid such as water or an organic solvent thereafter, the organotin compound is hardly eluted into the liquid.

The treatment to be used in the treatment method further contains a substance capable of releasing hydrogen, for example. In this case, the treatment is capable of partly decomposing the organotin compound, and elution of the organotin compound from the above-mentioned residue into the above-mentioned liquid may be suppressed more efficiently.

The substance containing an organotin compound employing the treatment method is dredged soil from sediment, for example.

The organotin compound treatment according to the present invention contains iron oxide and thus is inexpensive, and is capable of trapping efficiently the organotin compound in the liquid.

The method of treating a liquid containing an organotin compound according to the present invention allows trapping of the organotin compound in the liquid by the treatment brought into contact with the liquid, and thus the organotin compound concentration in the liquid can be reduced at low cost.

The method of treating a substance containing an organotin compound according to the present invention allows elution of the organotin compound in the substance containing an organotin compound into the liquid and trapping of the organotin compound by the treatment. Thus, even in the case where the residue having the liquid removed therefrom is brought into contact with a liquid such as water or an organic solvent, the organotin compound is hardly eluted into the liquid.

DETAILED DESCRIPTION OF THE INVENTION

An organotin compound treatment according to the present invention contains iron oxide. The iron oxide that may be used is not particularly limited, and various iron oxides included within a concept of iron oxide such as FeO, $Fe_2O_3$ (iron sesquioxide), and $Fe_3O_4$ (iron oxide black) may be used. Note that iron oxide black is a mixture of ferrous oxide (FeO) and iron sesquioxide ($Fe_2O_3$) and is usually referred to as magnetite. Two or more types of iron oxides may be mixed for use. The iron oxide may contain water, or contain substantially no water.

Inexpensive iron sesquioxide and iron oxide black obtained as by-products in a titanium oxide production process through a sulfuric acid method are preferably used. Those iron oxides are obtained in the titanium oxide production process through a sulfuric acid method as described below. First, sulfuric acid containing iron and obtained in the titanium oxide production process through a sulfuric acid method is neutralized with sodium hydroxide or calcium hydroxide (hydrated lime), and then subjected to concentration and separation treatment. Then, a filtrate obtained by filtering a supernatant from the separation treatment is further subjected to neutralization and oxidation treatment. To be specific, sodium hydroxide is added to the filtrate in a stream of air for treatment at a temperature of 65° C., a pH of 6.0 to 6.3, and an oxidation rate of 75 to 80%. Then, a product obtained through the neutralization and oxidation treatment is filtered for separation and then dried at about 120° C.

In the above-mentioned titanium oxide production process through a sulfuric acid method, iron sesquioxide is obtained as $Fe_2O_3 \cdot nCaSO_4 \cdot mH_2O$ after the neutralization of sulfuric acid containing iron. Further, iron oxide black is obtained as low crystalline iron oxide black having a FeO to $Fe_2O_3$ ratio ($FeO:Fe_2O_3$) of 10 to 30:90 to 70 through final drying at about 120° C. The final drying step is preferably performed in a nitrogen atmosphere, to thereby obtain iron oxide black having a high organotin compound trapping effect and having the FeO to $Fe_2O_3$ ratio as described above.

Note that the iron oxide differs from a water-soluble iron compound having crystallinity, which is produced in an aqueous solution of iron chloride such as $FeCl_2$ or $FeCl_3$, iron sulfate such as $FeSO_4$ or $Fe_2(SO_4)_3$, iron nitrate such as $Fe(NO_3)_2$ or $Fe(NO_3)_3$, or the like as a hydrate. The iron oxide has low crystallinity and property of difficult solubility in water.

The above-mentioned iron oxide is easily brought into contact with a liquid such as water or an organic solvent and is easily mixed uniformly with a substance containing an organotin compound as described below. Thus, the iron oxide is preferably in a form of powder, but its particle shape is not particularly limited. Iron oxide of finer particles is more easily dispersed uniformly in the liquid and is more easily mixed uniformly with the substance containing an organotin compound. Thus, a contact efficiency between the iron oxide and the organotin compound increases, to thereby allow more efficient trapping of the organotin compound. However, fining of the particles leads to high cost, and the iron oxide in a form of powder produced by using a current iron oxide production line can generally be used as it is. Note that iron oxide powder has an average particle size of preferably 50 μm or less, and more preferably 10 μm or less.

In the case where iron oxide black is used as iron oxide, methods or conditions for forming iron oxide black in a form of powder are not particularly limited. In general, iron oxide black is pulverized and dried in a stream of an inert gas containing no water (such as in a stream of nitrogen), to thereby prevent a reaction of iron oxide black with water or oxygen to degrade the organotin compound trapping effect.

The organotin compound treatment according to the present invention may substantially be formed of the above-mentioned iron oxide alone, but may further contain a substance capable of releasing hydrogen, in particular, a substance capable of releasing hydrogen into a liquid for enhancing an organotin compound treating effect. Such a substance (hereinafter, referred to as "substance capable of releasing hydrogen") is not particularly limited, but is preferably an inorganic substance capable of releasing hydrogen as hydrogen ions. Specific examples of the substance capable of releasing hydrogen include iron (Fe), sodium sulfite ($Na_2SO_3$), sodium dithionite ($Na_2S_2O_4$), sodium hydrogen sulfite ($NaHSO_3$), sodium thiosulfate ($Na_2S_2O_3$), and sodium borohydrate ($NaBH_4$). Two or more types of substances capable of releasing hydrogen may arbitrarily be used in combination.

The substance capable of releasing hydrogen is preferably at least one substance selected from iron, sodium sulfite, sodium dithionite, and sodium hydrogen sulfite because of non-toxicity, availability at low cost, and easy handling in storage.

The above-mentioned substance capable of releasing hydrogen is preferably in a form of powder for allowing uniform mixing with the iron oxide. To be specific, the substance capable of releasing hydrogen is preferably in a form of powder having an average particle size of 50 µm or less, and more preferably in a form of powder having an average particle size of 10 µm or less. Note that a particle shape is not particularly limited.

The organotin compound treatment containing a substance capable of releasing hydrogen contains the substance capable of releasing hydrogen preferably in a ratio of 1 to 300 parts by weight, and more preferably in a ratio of 5 to 30 parts by weight with respect to 100 parts by weight of the iron oxide. A ratio of the substance capable of releasing hydrogen of less than 1 part by weight may inhibit an effect to be obtained by using the substance capable of releasing hydrogen. In contrast, a ratio of the substance capable of releasing hydrogen of more than 300 parts by weight decreases a ratio of the iron oxide in the organotin compound treatment and may actually inhibit the organotin compound treating effect.

In general, the organotin compound treatment containing a substance capable of releasing hydrogen may be prepared by uniformly mixing the iron oxide and the substance capable of releasing hydrogen in the above-mentioned ratio by using a twin-screw mixer or a rod mill.

The organotin compound treatment according to the present invention may contain compounds containing silicon, titanium, aluminum, calcium, and the like as impurities, in addition to the substance capable of releasing hydrogen without inhibiting the intended effect.

The organotin compound treatment according to the present invention brought into a contact with a liquid such as water or an organic solvent traps the organotin compound in the liquid, more specifically, a tributyltin (TBT) compound such as bis-tributyltin oxide, tributyltin chloride, or tributyltin acetate, or a triphenyltin (TPT) compound such as bis-triphenyltin oxide, triphenyltin chloride, triphenyltin acetate, or triphenyltin hydroxide. To be specific, the organotin compound treatment is brought into contact with the organotin compound in the liquid to hold the organotin compound and to transfer the organotin compound from the liquid (a liquid phase) into the organotin compound treatment (a solid phase) for fixation. The organotin compound treatment according to the present invention inhibits elution of the thus trapped organotin compound into the liquid. A mechanism for trapping of the organotin compound in the liquid by the organotin compound treatment is not clarified, but the iron oxide in the organotin compound treatment presumably exhibits some physical adsorption capacity or chemical adsorption capacity with respect to the organotin compound.

The organotin compound treatment according to the present invention containing a substance capable of releasing hydrogen is capable of partly decomposing the organotin compound in the liquid. In this case, a dibutyltin (DBT) compound or a monobutyltin (MBT) compound may be produced through decomposition of TBT, for example, but those decomposed products are trapped by the iron oxide.

Thus, the organotin compound treatment according to the present invention may be used for a liquid treatment method for reducing an organotin compound concentration in the liquid, for example. To be specific, the organotin compound treatment can be used for reducing the organotin compound concentration in seawater, lake water, river water, raw water for drinking, ground water, industrial wastewater, other water, or an organic solvent such as hexane each containing an organotin compound, and for purifying such a liquid.

In the liquid treatment method, a liquid required to have a reduced organotin compound concentration (hereinafter, may be referred to as "liquid to be treated") and the organotin compound treatment according to the present invention (hereinafter, may simply be referred to as "treatment") are brought into contact with each other. A method of bringing the liquid to be treated and the treatment into contact with each other involves: storing the liquid to be treated in a vessel or a treatment tank; adding the treatment to the stored liquid to be treated; and stirring the whole. In this case, the treatment added to the liquid to be treated settles in the liquid to be treated while being dispersed in the liquid to be treated and trapping the organotin compound (while further partly decomposing the organotin compound in the case where the treatment contains a substance capable of releasing hydrogen), and the trapped organotin compound is hardly eluted into the liquid to be treated. Thus, separation of the treatment from the liquid to be treated after the treatment through a method such as filtration provides a treated liquid having a reduced organotin compound concentration.

Further, the method of bringing the liquid to be treated and the treatment into contact with each other may involve allowing the liquid to be treated to pass through a column filled with the treatment. In this case, the liquid to be treated allowed to pass through the column has a reduced organotin compound concentration.

In the case where the liquid to be treated is environmental water such as seawater, lake water, or river water, the method of bringing the liquid to be treated and the treatment into contact with each other may involve spraying the treatment directly into sea, lake, or river. For example, at a harbor polluted with an organotin compound, the treatment is sprayed directly into the harbor for reducing an organotin compound concentration in seawater. In this case, the treatment sprayed into the harbor settles while trapping the organotin compound in the seawater (while further partly decomposing the organotin compound in the case where the treatment contains a substance capable of releasing hydrogen), and deposits on sediment. Then, the treatment deposited on the sediment prevents elution of the trapped organotin compound into water, to thereby reduce the organotin compound concentration in the seawater.

In the above-mentioned method of treating a liquid containing an organotin compound, the treatment is generally used in an amount of 0.005 to 30 parts by weight, and preferably 0.05 to 5 parts by weight with respect to 100 parts by weight of the liquid to be treated. A use amount of the treatment of less than 0.005 part by weight inhibits reduction of the organotin compound concentration in the liquid to be treated. In contrast, a use amount of the treatment of more than 30 parts by weight inhibits the intended effect and is not economical.

In the above-mentioned method of treating a liquid containing an organotin compound employing the substance capable of releasing hydrogen as a treatment, a pH of the liquid containing an organotin compound is preferably adjusted to 0.7 or less within a range involving no technical difficulties. In the case where the pH of the liquid containing an organotin compound is more than 7.0, release of hydrogen from the substance capable of releasing hydrogen may be suppressed, and a function of the substance capable of releasing hydrogen may hardly be exhibited. The pH of the liquid containing an organotin compound may generally be adjusted by adding an acid to the liquid containing an organotin compound. Examples of the acid that can be used generally include: an inorganic acid such as hydrochloric acid or sulfuric acid; and an organic acid such as oxalic acid or acetic acid.

Further, the organotin compound treatment according to the present invention may be used in treatment of a substance containing an organotin compound, that is, in treatment for suppressing elution of an organotin compound from dredged soil from sediment at a harbor, lake, river, or the like, from polluted soil of an old factory site, or the like. In this case, first, the substance containing an organotin compound and the treatment are mixed in the presence of a liquid, and the mixture is preferably left standing for about a period of 1 day to 1 month. At this time, the substance containing an organotin compound and the treatment are preferably stirred in the presence of a liquid. The liquid preferably allows elution of the organotin compound in the substance containing an organotin compound, and examples of the liquid include water, an organic solvent, and a mixed liquid of water and an organic solvent. In the case where dredged soil, that is, a substance containing an organotin compound and having a high water content is to be treated, mixing of the dredged soil and the treatment involves mixing of the dredged soil and the treatment in the presence of water in the dredged soil. In such a case, the above-mentioned liquid may arbitrarily be added as required. In this step, the organotin compound in the substance containing an organotin compound is eluted into the liquid and trapped by the treatment (the eluted organotin compound is further partly decomposed depending on the type of treatment). The trapped organotin compound is hardly eluted into the liquid.

Next, the above-mentioned liquid is removed from the mixture of the substance containing an organotin compound and the treatment. Even in the case where the thus obtained residue is brought into contact with a liquid such as water or an organic solvent, elution of the organotin compound is suppressed. For example, in the case where the substance containing an organotin compound is dredged soil, the organotin compound in the dredged soil is trapped (or partly decomposed) by the treatment. Thus, even in the case where the obtained residue (that is, the mixture of sand derived form the dredged soil, and the treatment) is left standing on the ground or recycled as a land-fill soil and is brought into contact with water such as rain water or spray water, elution of the organotin compound is suppressed, to thereby inhibit environmental pollution due to the organotin compound.

In the method of treating a substance containing an organotin compound, the treatment is generally mixed in an amount of preferably 5 to 500 parts by weight, and more preferably 10 to 200 parts by weight with respect to 100 parts by weight of a solid content of the substance containing an organotin compound in view of efficiently suppressing the elution of the organotin compound. An amount of the liquid is generally set in an amount of preferably 50 to 900 wt %, and more preferably 100 to 400 wt % with respect to a total amount of the solid content of the substance containing an organotin compound and the treatment for allowing efficient elution of the organotin compound in the substance containing an organotin compound into the liquid.

In the above-mentioned method of treating a substance containing an organotin compound employing the substance capable of releasing hydrogen as a treatment, a pH of the liquid during mixing of the substance containing an organotin compound and the treatment is preferably adjusted to 0.7 or less within a range involving no technical difficulties. In the case where the pH of the liquid is more than 7.0, release of hydrogen from the substance capable of releasing hydrogen may be suppressed, and a function of the substance capable of releasing hydrogen may hardly be exhibited. The pH of the liquid may generally be adjusted by adding an acid during the above-mentioned mixing. An acid that can be used is the same as that can be used for the method of treating a liquid containing an organotin compound described above. In the case where the substance containing an organotin compound is dredged soil, an amount of an acid required for pH adjustment may be suppressed by removing calcareous impurities such as shells or coral pieces from the dredged soil in advance.

EXAMPLES

Example 1

870 ng of a tributyltin (TBT) compound standard substance and 340 ng of a triphenyltin (TPT) compound standard substance were added to 30 ml of a 3% saline solution, to thereby prepare a test liquid. 1 g of iron oxide black was added to the test liquid, and the whole was stirred for 1 hour. Then, the test liquid was subjected to centrifugation and separated into a supernatant and iron oxide black. Contents of TBT and TPT in the supernatant were measured with a gas chromatograph mass spectrometer (GC/MS). As a result, the contents of TBT and TPT in the supernatant were 210 ng (removal rate of 76%) and 150 ng (removal rate of 56%), respectively, and TBT and TPT in the test liquid were drastically reduced.

Meanwhile, a TBT and TPT elution test was performed on the separated iron oxide black by using acetone. Acetone, not water, was used in the elution test for setting harsh conditions in which TBT and TPT are more liable to be eluted. In the elution test, 50 ml of acetone was added to the separated iron oxide black, and the whole was shaken with a shaker for 1 hour. Then, the resultant was subjected to centrifugation, to thereby obtain a supernatant. The supernatant was subjected to a solvent extraction method, and contents of TBT and TPT in a solvent were measured with a gas chromatograph mass spectrometer (GC/MS). As a result, the contents of TBT and TPT in the supernatant were substantially zero. The results revealed that TBT and TPT are held stably by iron oxide black and are hardly eluted into acetone, that is, hardly eluted into water.

Example 2

0.8 ton of an iron-based mixture of iron (Fe) and iron oxide black ($Fe_3O_4$) (in a weight ratio, $Fe:Fe_3O_4=1:4$) and 0.8 ton of water (seawater) were added to 1.0 ton of dredged mud (wet dredged mud having a water content of 50 wt %) from sediment polluted with an organotin compound, and the whole was mixed. Then, the thus-treated dredged mud was left standing for 24 hours, and a content of the organotin compound was studied.

The dredged mud after being left standing was subjected to a solvent extraction method, and contents of organotin compounds extracted with a solvent were measured with a gas chromatograph mass spectrometer (GC/MS). The contents of a tributyltin (TBT) compound, a dibutyltin (DBT) compound, and a monobutyltin (MBT) compound in the dredged mud before the treatment were 77 ng/g, 100 ng/g, and 95 ng/g, respectively. However, after the treatment, the content of TBT extracted with the solvent was 10 ng/g, and the contents of DBT and MBT extracted with the solvent were each less than a minimum limit of detection. The results revealed that the organotin compound in the dredged mud is held stably by the iron-based mixture and is hardly eluted into water.

The invention claimed is:

1. An organotin compound treatment for treating an organotin compound in a liquid, characterized by comprising iron oxide black.

2. An organotin compound treatment according to 1, characterized by further comprising a substance capable of releasing hydrogen.

3. A method of treating a liquid containing an organotin compound, characterized by comprising bringing the liquid containing an organotin compound into contact with a treatment containing iron oxide.

4. A method of treating a liquid containing an organotin compound according to claim 3, characterized in that the treatment further contains a substance capable of releasing hydrogen.

5. A method of treating a liquid containing an organotin compound according to claim 3 or 4, characterized in that the liquid comprises seawater.

6. A method of treating a substance containing an organotin compound, characterized by comprising:

mixing the substance containing an organotin compound and a treatment containing iron oxide in the presence of a liquid; and removing the liquid from a mixture of the substance containing an organotin compound and the treatment.

7. A method of treating a liquid containing an organotin compound according to claim 6, characterized in that the treatment further contains a substance capable of releasing hydrogen.

8. A method of treating a liquid containing an organotin compound according to claim 6 or 7, characterized in that the substance containing an organotin compound comprises dredged soil from sediment.

9. An organotin compound treatment for treating an organotin compound in a liquid, characterized by comprising iron oxide and by further comprising a substance capable of releasing hydrogen.

10. An organotin compound treatment according to claim 2 or 9, characterized in that the substance capable of releasing hydrogen comprises at least one substance selected from the group consisting of iron, sodium sulfite, sodium dithionite, and sodium hydrogen sulfite.

* * * * *